United States Patent
Hasz et al.

(10) Patent No.: US 6,261,643 B1
(45) Date of Patent: Jul. 17, 2001

(54) PROTECTED THERMAL BARRIER COATING COMPOSITE WITH MULTIPLE COATINGS

(75) Inventors: Wayne Charles Hasz, Pownal, VT (US); Marcus Preston Borom, Niskayuna; Curtis Alan Johnson, Schenectady, both of NY (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/258,829

(22) Filed: Feb. 26, 1999

Related U.S. Application Data

(62) Division of application No. 08/838,372, filed on Apr. 8, 1997, now Pat. No. 5,914,189.

(51) Int. Cl.⁷ ..................................... B05D 3/02
(52) U.S. Cl. ............... 427/419.1; 427/402; 427/419.2; 427/419.3; 427/419.7; 427/419.8
(58) Field of Search ................... 427/377, 402, 427/419.1, 419.2, 419.3, 419.7, 419.8

(56) References Cited

U.S. PATENT DOCUMENTS

| | | |
|---|---|---|
| 4,399,199 | 8/1983 | McGill et al. . |
| 4,574,451 * | 3/1986 | Smashey et al. ............ 29/423 |
| 4,588,607 | 5/1986 | Matarese et al. . |
| 4,676,994 | 6/1987 | Demaray . |
| 5,080,977 | 1/1992 | Zaplatynsky . |
| 5,338,577 * | 8/1994 | Burdette, II ............ 427/453 |
| 5,660,885 | 8/1997 | Hasz et al. . |
| 5,773,141 | 6/1998 | Hasz et al. . |
| 5,851,678 | 12/1998 | Hasz et al. . |
| 5,871,820 | 2/1999 | Hasz et al. . |

OTHER PUBLICATIONS

"Fatigue of Thick Thermal Barrier Coatings", by K. F. Wesling et al., J. Am. Ceramics Soc., 77 {7}pp. 1863–1867 (1994).

"Degradation of Thermal–Barrier Coatings at Very High Temperatures", by F. H. Stott et al., MRS Bulletin, pp. 45–50 (Oct. 1994).

* cited by examiner

Primary Examiner—Archene Turner
(74) Attorney, Agent, or Firm—Noreen C. Johnson; Douglas E. Stoner

(57) ABSTRACT

A composite that protects thermal barrier coatings from the deleterious effects of environmental contaminants at operational temperatures is discovered. The thermal barrier coated parts have least two outer protective coatings that decrease infiltration of molten contaminant eutectic mixtures into openings in the thermal barrier coating.

20 Claims, No Drawings

PROTECTED THERMAL BARRIER COATING COMPOSITE WITH MULTIPLE COATINGS

This application is a division of application Ser. No. 08/838,372, filed Apr. 8, 1997 now U.S. Pat. No. 5,914,189 which is hereby incorporated by reference in its entirety.

FIELD OF THE INVENTION

The present invention relates to a composite that protects thermal barrier coatings deposited on gas turbine and other heat engine parts from the deleterious effects of environmental contaminants. Particularly, the invention relates to a composite thermal barrier coated part having multiple surface protective coatings on the ceramic thermal barrier coating.

BACKGROUND OF THE INVENTION

Thermal barrier coatings (TBCs) are deposited onto gas turbine and other heat engine parts to reduce heat flow and to limit the operating temperature of metal parts. These coatings generally are a ceramic material, such as chemically stabilized zirconia. Yttria-stabilized zirconia, scandia-stabilized zirconia, calcia-stabilized zirconia, and magnesia-stabilized zirconia are contemplated as thermal barrier coatings. The thermal barrier coating of choice is a yttria-stabilized zirconia ceramic coating. A typical thermal barrier coating comprises about 8 weight percent yttria-92 weight percent zirconia. The thickness of a thermal barrier coating depends on the application, but generally ranges between about 5–60 mils thick for high temperature engine parts.

Metal parts provided with thermal barrier coatings can be made from nickel, cobalt, and iron based superalloys. Thermal barrier coatings are especially suited for parts and hardware used in turbines. Examples of turbine parts would be turbine blades, buckets, nozzles, combustion chamber liners, and the like.

Thermal barrier coatings are a key element in current and future gas turbine engine designs expected to operate at high temperatures which produce high thermal barrier coating surface temperatures. The ideal system for a high temperature engine part consists of a strain-tolerant thermal barrier ceramic layer deposited onto a bond coat which exhibits good corrosion resistance and closely matched thermal expansion coefficients.

Under service conditions, thermal barrier coated engine parts can be susceptible to various modes of damage, including erosion, oxidation, and attack from environmental contaminants. At temperatures of engine operation adherence of these environmental contaminants on the hot thermal barrier coated surface can cause damage to the thermal barrier coating. Environmental contaminants form compositions, which are liquid at the surface temperatures of thermal barrier coatings. Chemical and mechanical interactions occur between the environmental contaminant compositions and the thermal barrier coatings. Molten contaminant compositions can dissolve the thermal barrier coating or can infiltrate its pores and openings, initiating and propagating cracks causing delamination and loss of thermal barrier coating material.

Some environmental contaminant compositions that deposit on thermal barrier coated surfaces contain oxides of calcium, magnesium, aluminum, silicon, and mixtures thereof. These oxides combine to form contaminant compositions comprising calcium-magnesium-aluminum-silicon-oxide systems (Ca—Mg—Al—Si—O), herein referred to as CMAS. Damage to thermal barrier coatings occurs when the molten CMAS infiltrates the thermal barrier coating. After infiltration and upon cooling, the molten CMAS, or other molten contaminant composition, solidifies. The stress build up in the thermal barrier coating is sufficient to cause spallation of the coating material and loss of the thermal protection that it provides to the underlying part.

There is a need to reduce or prevent the damage to thermal barrier coatings caused by the reaction or infiltration of molten contaminant compositions at the operating temperature of the engine. This can be accomplished by providing the TBC ceramic coat with multiple protective coatings that reduce damage to the thermal barrier coating from molten contaminants.

SUMMARY OF THE INVENTION

The present invention satisfies this need by providing a protected thermal barrier coating composite comprising at least two continuous protective coatings covering an outer surface of a thermal barrier coating. The invention also includes a protected thermal barrier coated engine part comprising an engine structural component with a bond coat, a thermal barrier coating on the bond coat and at least two protective layers on the thermal barrier coating. The protective coatings reduce or prevent attack of the thermal barrier coating from environmental contaminants and their corresponding contaminant compositions. Contemplated protective coatings include impermeable barrier coatings, sacrificial oxide coatings, and non-wetting coatings.

The invention includes a method for making a thermal barrier coating-protecting-composite which comprises depositing an impermeable barrier or sacrificial oxide first coating on the thermal barrier coating, and then depositing at least one other coating that is non-wetting, sacrificial or impermeable on the first coating.

Herein, the terms "impermeable barrier coating", "sacrificial oxide coating", and "non-wetting coating" are defined as follows.

An impermeable coating is defined as a protective layer which inhibits liquid contaminant compositions from infiltrating into or reacting with the thermal barrier coating at the operating temperature of the thermal barrier coating. The impermeable barrier is a dense, non-cracked, non-porous layer comprising oxides, non-oxides, or metallic coatings in conjunction with thermal barrier coatings.

A sacrificial oxide coating is defined as a layer which when in contact with the environmental contaminant composition raises the melting temperature or viscosity of the contaminant composition as it forms on the hot surfaces of the composite. As a result, the contaminant composition does not flow or form a reactive liquid. The sacrificial oxide coating undergoes chemical or physical changes when in contact with the contaminant composition at operating temperatures by dissolving in the contaminant composition or reacting with it to form a by-product material which is not liquid or at least more viscous than the original contaminant composition.

A non-wetting coating is defined as an outer layer which minimizes contact between underlying layers and the molten contaminant composition by providing a surface that is non-wetting to environmental contaminant compositions. As a result, the contaminant composition's ability to penetrate the thermal barrier coating via capillary action is decreased and the integrity of the composite at high temperature performance is enhanced.

Environmental contaminants are materials that exist in the environment and are ingested into engines from air and fuel sources, and impurities and oxidation products of engine components, such as iron oxide.

The term "operating temperature" means the surface temperature of the thermal barrier coating during its operation in a given application, such as a gas turbine engine. Such temperatures are above room temperature, and generally are above 500° C. High temperature operation of thermal barrier coated parts is usually above 1000° C.

DESCRIPTION OF THE INVENTION

It has been discovered that a composite comprising a thermal barrier coated part with at least two protective coatings on the ceramic thermal barrier coating exhibit decreased damage from environmental contaminants that form molten contaminant compositions at the operating temperatures of the engine system. The protective coatings are impermeable coatings, sacrificial oxide coatings, and non-wetting coatings.

Examples of composites of this invention include a thermal barrier coating and a bond coat on a part made of an alloy selected from the group consisting of nickel based alloys, cobalt based alloys, iron based alloys, and mixtures thereof, with the following protective layers: an impermeable barrier first coating and a sacrificial oxide second coating; an impermeable barrier first coating with a non-wetting second coating; an impermeable barrier first coating with another type of an impermeable barrier as a second coating; an impermeable barrier first coating with a sacrificial oxide second coating and a non-wetting third coating: a sacrificial oxide first coating and an impermeable barrier second coating; a sacrificial oxide first coating and a non-wetting second coating; a sacrificial oxide first coating, an impermeable barrier second coating, and a non-wetting third coating. It is to be pointed out that the non-wetting coating is always the outer or last coating. Either the impermeable barrier coating or the sacrificial oxide coating may be the first coating on the thermal barrier coating.

The purpose of the multiple coatings is to protect the thermal barrier coating against damage from environmental contaminant compositions at operating temperatures. Sources of environmental contaminants include, but are not limited to, sand, dirt, volcanic ash, fly ash, cement, runway dust, substrate impurities, fuel and air sources, oxidation products from engine components, and the like. At operating temperatures of the thermal barrier coating, the environmental contaminants adhere to the surfaces of thermal barrier coated parts. The environmental contaminants then form contaminant compositions on surfaces of the thermal barrier coating which may have melting ranges or temperatures at or below the operating temperature.

In addition, the environmental contaminant may include magnesium, calcium, aluminum, silicon, chromium, iron, nickel, barium, titanium, alkali metals, and compounds thereof, to mention a few. The environmental contaminants may be oxides, phosphates, carbonates, salts, and mixtures thereof.

The chemical composition of the contaminant composition corresponds to the composition of the environmental contaminants from which it is formed. For example, at operational temperatures of about 1000° C. or higher, the contaminant composition corresponds to compositions in the primary phase field of calcium-magnesium-aluminum-silicon oxide systems or CMAS. Generally, the environmental contaminant compositions known as CMAS comprise primarily a mixture of magnesium oxide (MgO), calcium oxide (CaO), aluminum oxide ($Al_2O_3$), and silicon oxide ($SiO_2$). Other elements, such as nickel, iron, titanium, and chromium, may be present in the CMAS in minor amounts when these elements or their compounds are present in the environmental contaminants. A minor amount is an amount less than about ten weight percent of the total amount of contaminant composition present.

The chemical composition of a CMAS eutectic mixture was determined by electron microprobe analysis of infiltrated deposits found on thermal barrier coated engine parts where deposit-induced damage to the thermal barrier coating had been observed. Analysis indicated that 127 microns (5 mils) of CMAS-like deposits (~34 $mg/cm^2$ assuming a density of 2.7 $g/cm^3$) can form on thermal barrier coating surfaces. The CMAS deposits evaluated were typically in the compositional range (weight %): 5–35% CaO, 2–35% MgO, 5–15% $Al_2O_3$, 5–55% $SiO_2$, 0–5% NiO, 5–10% $Fe_2O_3$, however the content of the ubiquitous $Fe_2O_3$ can be as large as 75 wt %. An average composition for such deposits (weight %: 28.7% CaO, 6.4% MgO, 11.1% $Al_2O_3$, 43.7% $SiO_2$, 1.9% NiO, 8.3% $Fe_2O_3$) was synthesized in the laboratory and used as a standard CMAS for the purpose of evaluating protective coatings. Differential thermal analysis of actual CMAS deposits and the synthesized CMAS indicated that the onset of melting occurs at about 1190° C. with the maximum of the melting peak occurring at about 1260° C. Thermal testing of candidate protective coatings for thermal barrier coatings versus the laboratory synthesized CMAS composition were carried out at about 1260° C.

Viscosity data on a similar CMAS composition indicates that the viscosity of CMAS is about 4 Pa·s (Pascal second) at 1260° C. This fluid phase infiltrates the TBC and induces TBC damage either by freezing-induced spallation or by high temperature chemical attack induced destabilization. Laboratory experiments with unprotected thermal barrier coatings indicate that, under isothermal conditions, 8 mg $CMAS/cm^2$ is sufficient to cause entire thermal barrier coating layers to spall off.

To protect the thermal barrier coating from environmental contaminant compositions, such as CMAS, multiple protective coatings are used. Each protective coating is now discussed in turn, starting with impermeable barrier coatings, sacrificial oxide coatings, and then non-wetting coatings.

Impermeable barrier coatings are ceramic or metal layers. The coatings can be various oxides; non-oxides such as carbides, silicides, and nitrides; and metals that form non-porous deposits. The metal oxide coating is selected from the group consisting of silicon oxide, tantalum oxide, scandium oxide, aluminum oxide, hafnium oxide, zirconium oxide, calcium zirconate, and spinels, such as $MgAl_2O_4$, mixtures thereof, and the like. The metal carbide coating is selected from the group consisting of silicon carbide, tantalum carbide, titanium carbide, tungsten carbide, silicon oxy carbide (SiOC), mixtures thereof, and the like. The metal nitride coating is selected from the group consisting of silicon nitride, zirconium nitride, tantalum nitride, boron nitride, mixtures thereof, and the like. The metal silicide is selected from the group consisting of chromium silicide, molybdenum silicide, tantalum silicide, titanium silicide, tungsten silicide, zirconium silicide, mixtures thereof, and the like. Precious metals that are suitable for coatings include platinum, palladium, silver, gold, ruthenium, rhodium, iridium, and alloys thereof, such as 80 weight percent palladium-20 weight percent silver.

Impermeable barrier coatings that are especially effective are a palladium-silver alloy, in particular about 80 weight % palladium-20 weight % silver, palladium, platinum, silicon carbide (SiC), silicon oxide ($SiO_2$), tantalum oxide ($Ta_2O_5$), calcium zirconate ($CaZrO_3$), spinel ($MgAl_2O_4$), silicon oxy carbide (SiOC), and mixtures thereof.

The impermeable barrier coating is deposited on thermal barrier coated parts by methods known in the art, such as sol-gel, sputtering, air plasma spray, organo-metallic chemical vapor deposition, physical vapor deposition, chemical vapor deposition, and the like. Thicknesses of the impermeable barrier coating can vary from about 0.2 micrometers to about 250 micrometers. About 2–125 micrometers is a preferred thickness for the impermeable barrier coating. Also, if thick impermeable barrier coatings are used (about 125 micrometers or more), a graded deposit may be necessary to keep internal stresses minimized in order that coating delamination does not occur.

An effective amount of an impermeable barrier coating is an amount needed to inhibit the contaminant composition from penetrating an opening in the thermal barrier coating. The thickness of the impermeable barrier coating is determined by the application and design of the thermal barrier coated part, the amount and composition of the contaminant composition that is encountered during service, and the temperature that the thermal barrier coated part is operated at.

In this invention, the sacrificial or reactive coating is usually a metal oxide, that reacts chemically with the contaminant composition at the surface temperature of the thermal barrier coating. The chemical reaction is one in which the sacrificial oxide coating is consumed, at least partially, and elevates the melting temperature or viscosity of the contaminant composition. The melting temperature of the contaminant composition is preferably increased by at least about 10° C., and most preferably about 50–100° C., above the surface temperature of the thermal barrier coating during its operation.

The composition of the sacrificial oxide coating is in part based on the composition of the environmental contaminants and the surface temperature of the thermal barrier coating during operation. Usually, the sacrificial oxide coating contains an element or elements that are present in the liquid contaminant composition.

Suitable sacrificial oxide coatings that react with the CMAS composition to raise its melting temperature or viscosity, include, but are not limited to, alumina, magnesia, chromia, calcia, scandia, calcium zirconate, silica, spinels such as magnesium aluminum oxide, and mixtures thereof.

For instance, it has been found that a sacrificial oxide coating, such as scandia, can be effective in an amount of about 1 weight percent of the total CMAS composition present. Preferably, to raise the CMAS melting temperature from 1190° C. to greater than 1300° C., about 10–20 weight percent of scandia is used for the sacrificial oxide coating.

As little as about one weight percent of the oxide coating based on the total weight of the contaminant composition present on the surface of the coating can help prevent infiltration of molten contaminant compositions into openings in the thermal barrier coating. Preferably, about 10–20 weight percent of the sacrificial oxide coating is deposited on the impermeable barrier coating. In some instances, the amount of the sacrificial oxide coating deposited may be up to fifty weight percent or a 1:1 ratio of oxide coating to liquid contaminant composition.

The sacrificial oxide coating of the composite is deposited on the thermal barrier coating or the impermeable barrier coating by methods known in the art, such as sol-gel, sputtering, air plasma spray, organo-metallic chemical vapor deposition, physical vapor deposition, chemical vapor deposition, and the like. Thicknesses of the sacrificial oxide coating can vary from about 0.2 micrometers to about 250 micrometers. The preferred thickness is about 2–125 micrometers. The thickness of the oxide coating is at least in part, determined by the chemistry of the particular oxide coating, the operating temperature of the thermal barrier coating, and the amount and composition of the contaminant. If thick sacrificial oxide coatings are required, i.e., about 125 micrometers or more, a compositionally graded deposit may be necessary to keep internal stresses minimized in order that delamination of the sacrificial coating does not occur.

In the practice of this invention, if the surface temperature of the thermal barrier coating during operation is about 1200° C., then it is preferred to increase the melting temperature of the CMAS eutectic mixture to at least about 1210° C., and most preferably, to increase the CMAS melting temperature to about 1260–1310° C., when using a sacrificial oxide coating. The melting temperature of the CMAS composition should be raised at least 10° C. higher than the surface temperature of the thermal barrier coating during its operation.

Non-wetting protective coatings, deposited on the impermeable barrier coating or the sacrificial oxide coating, can be various oxides; non-oxides such as carbides, nitrides, and silicides; and precious metals. The oxide coating is selected from the group consisting of silicon oxide, zirconium oxide, hafnium oxide, beryllium oxide, lanthanum oxide, and mixtures thereof. The carbide coating is selected from the group consisting of silicon carbide, tantalum carbide, titanium carbide, tungsten carbide, and mixtures thereof. The nitride coating is selected from the group consisting of silicon nitride, aluminum nitride, titanium nitride, zirconium nitride, hafnium nitride, niobium nitride, tantalum nitride, boron nitride, and mixtures thereof. The silicide coating is selected from the group consisting of chromium silicide, molybdenum silicide, tantalum silicide, titanium silicide, tungsten silicide, zirconium silicide, and mixtures thereof. Metals that are suitable for coatings include platinum, palladium, silver, gold, ruthenium, rhodium, iridium, and mixtures thereof.

Non-wetting coatings that are especially effective are a palladium-silver alloy, in particular about 80 weight % palladium-20 weight % silver, palladium, platinum, aluminum nitride (AlN), boron nitride (BN), silicon carbide (SiC), molybdenum silicide ($MoSi_2$), silicon oxide ($SiO_2$), zircon ($ZrSiO_4$), silicon oxy carbide (SiOC), and mixtures thereof.

The non-wetting coating is deposited on thermal barrier coated parts by methods known in the art, such as sol-gel, sputtering, air plasma spray, organo-metallic chemical vapor deposition, physical vapor deposition, chemical vapor deposition, and the like. Thicknesses of the non-wetting coating can vary from about 0.2 micrometers to about 250 micrometers. A preferred thickness of the non-wetting coating is about 2–125 micrometers. If thick non-wetting protective coatings are required (about 125 micrometers or more), a graded deposit may be necessary to keep internal stresses minimized in order that coating delamination does not occur.

An effective amount of a non-wetting coating is an amount needed to inhibit the environmental contaminants and contaminant eutectic mixture from adhering to the surface of a thermal barrier coated part. An effective amount of the non-wetting coating also decreases infiltration of the contaminant eutectic mixture into an opening of the thermal barrier coating. The thickness of the non-wetting coating is determined by the choice of coating, the application of the TBC part and its operational temperature, and the amount of the contaminant eutectic mixture that is encountered.

Non-wetting coatings are selected based on the surface temperature of the TBC part during its operation and the composition of the environmental contaminants. The non-wetting protective coating must have a melting temperature above the operational temperature of the thermal barrier coated part. For instance, if an operational temperature of a thermal barrier coated part is about 900° C., then the non-wetting protective coating has a melting temperature above 900° C.

In accordance with this invention, the thermal barrier coating-protecting-composite is described in the following examples in terms of a impermeable barrier coating adjacent to the thermal barrier coating. However, it is contemplated that the other protective coatings, i.e. sacrificial oxide coating, can be adjacent to the thermal barrier coating in combination with a secondary or even ternary protective coating.

EXAMPLES

Composites with sacrificial oxide coatings on thermal barrier coated parts were investigated to prevent the infiltration of environmentally deposited mixtures of oxides of calcium, magnesium, aluminum, and silicon (CMAS).

Survey studies of candidate coatings were conducted using differential thermal analysis (DTA) and thermodynamic calculation to assess the ability of candidate sacrificial materials to react with CMAS and increase the melting temperature such that infiltration of the CMAS does not occur into the thermal barrier coating during service. Viscosity measurements were used to assess the ability of sacrificial oxide coatings to react with CMAS, to increase the liquid phase viscosity, and thereby, to limit physical infiltration into the thermal barrier coating microstructure. Sessile drop contact angle measurements were made to assess the non-wetting nature of the protective coating. Mercury porosimetry was used to assess the impermeable nature of the secondary coating.

Candidate composite coatings were deposited on thermal barrier coated substrates and assessed for CMAS infiltration resistance. Coatings were deposited by screen printing, sol-gel, air plasma spray, sputtering, and MOCVD methods.

The effectiveness of protective coatings in preventing CMAS-infiltration-induced thermal barrier coating damage was tested by comparing the infiltration resistance of protected and non-protected thermal barrier coated substrates which were thermally cycled in the presence of surface deposits of CMAS. In these experiments, 8 mg/cm$^2$ of ground pre-reacted CMAS was deposited on masked areas of the thermal barrier coated substrates. A thermal cycle consisted of heating the samples to 1260° C. in 10 minutes, holding it at 1260° C. for 10 minutes, followed by cooling it to room temperature in 30 minutes. After each cycle the samples were inspected with the unaided eye and at 50× using a stereo microscope. This cycle was repeated several times. After completion of thermal testing, the samples were sectioned, metallographically polished, and inspected using bright field and dark field optical microscopy, SEM and electron microprobe chemical analysis.

Example 1

Example 1 demonstrates the effect of CMAS on a thermal barrier coated part without a protective coating. Non-protected thermal barrier coating samples tested in the above-mentioned fashion exhibit visible CMAS induced thermal barrier coating swelling and cracking (visible on sample edge with stereomicroscope). Metallographic preparation and inspection of the non-protected samples shows CMAS induced thermal barrier coating densification, cracking and exfoliation.

Example 2

Example 2 demonstrates an impermeable barrier coating adjacent to the thermal barrier coating with a sacrificial coating. A thick film (125 micrometers) of 80 weight percent palladium-20 weight percent silver was deposited by thick film screen printing of electrode paste on a 8 weight percent yttria-stabilized 92 weight percent zirconia coated coupon. The palladium-silver coating formed a dense, continuous film without voids. A scandia coating was deposited on the coated coupon. When about eight mg/cm$^2$ CMAS are deposited on the top surface of the protected TBC, and thermally cycled, the underlying thermal barrier coating was not damaged as in Example 1.

Example 3 demonstrates two impermeable barrier coatings adjacent to the thermal barrier coating. A thick film (125 micrometers) of 80 weight percent palladium-20 weight percent silver was deposited by thick film screen printing of electrode paste on a 8 weight percent yttria-stabilized 92 weight percent zirconia coated coupon. The palladium-silver coating formed a dense, continuous film without voids. A spinel coating was then deposited to provide a second impermeable barrier on the coated coupon. When about eight mg/cm$^2$ CMAS are deposited on the top surface of the protected TBC, and thermally cycled, the underlying thermal barrier coating was not damaged as in Example 1.

What is claimed:

1. A method for forming a thermal barrier coating-protecting-composite comprising: depositing an impermeable barrier or sacrificial oxide first coating on the thermal barrier coating, and then depositing at least one other protective second coating that is non-wetting, sacrificial or impermeable on the first coating.

2. A method according to claim 1 where a thickness of the protective first coating is about 0.2 micrometers to about 250 micrometers and the thickness of the protective second coating is about 0.2 micrometers to about 250 micrometers.

3. A method according to claim 1 where the protective first coating is deposited by sol-gel, sputtering, air plasma spray, organo-metallic chemical vapor deposition, physical vapor deposition, or chemical vapor deposition and the protective second coating is deposited by sol-gel, sputtering, air plasma spray, organo-metallic chemical vapor deposition, physical vapor deposition, or chemical vapor deposition.

4. A method according to claim 1, wherein the impermeable barrier coating is selected from the group consisting of a metal oxide, a metal carbide, a metal nitride, a metal silicide, a precious metal, and mixtures thereof.

5. The method of claim 4, wherein the metal oxide is selected from the group consisting of silicon oxide, tantalum oxide, scandium oxide, aluminum oxide, hafnium oxide, zirconium oxide, a spinel, calcium zirconate, and mixtures thereof.

6. The method of claim 5, wherein the spinel is $MgAl_2O_4$.

7. The method of claim 4, wherein the metal carbide is selected from the group consisting of silicon carbide, tantalum carbide, titanium carbide, tungsten carbide, silicon oxycarbide (SiOC), and mixtures thereof.

8. The method of claim 4, wherein the metal nitride is selected from the group consisting of silicon nitride, zirconium nitride, tantalum nitride, boron nitride, and mixtures thereof.

9. The method of claim 4, wherein the metal silicide is selected from the group consisting of chromium silicide, molybdenum silicide, tantalum silicide, titanium silicide, tungsten silicide, zirconium silicide, and mixtures thereof.

10. The method of claim 4, wherein the precious metal is selected from the group consisting of platinum, palladium, silver, gold, ruthenium, rhodium, iridium, and alloys thereof.

11. A method according to claim 1, wherein the sacrificial oxide coating is selected from the group consisting of alumina, magnesia, chromia, calcia, calcium zirconate, scandia, silica, magnesium aluminum oxide, and mixtures thereof.

12. The method of claim 1, wherein the sacrificial oxide coating is present in an amount sufficient to increase the melting temperature of a contaminant eutectic mixture about 10° C. above a surface temperature of the thermal barrier-coated part at operational temperatures.

13. The method of claim 1, wherein the non-wetting coating is selected from the group consisting of silicon oxide, zirconium oxide, hafnium oxide, beryllium oxide, lanthanum oxide, silicon carbide, tantalum carbide, titanium carbide, tungsten carbide, silicon nitride, aluminum nitride, titanium nitride, zirconium nitride, hafnium nitride, niobium nitride, tantalum nitride, boron nitride, chromium silicide, molybdenum silicide, tantalum silicide, titanium silicide, tungsten silicide, zirconium silicide, platinum, palladium, silver, gold, ruthenium, rhodium, iridium, and mixtures thereof.

14. The method of claim 1, wherein the non-wetting coating is selected from the group consisting of palladium, silver, palladium-silver alloys, platinum, aluminum nitride, boron nitride, silicon carbide, molybdenum silicide, silicon oxide, zircon, silicon oxycarbide, and mixtures thereof.

15. The method of claim 1, wherein the first coating comprises an impermeable barrier material, and the second coating comprises a sacrificial material.

16. The method of claim 1, wherein both the first coating and the second coating comprise impermeable barrier materials.

17. The method of claim 1, wherein the thermal barrier coating comprises yttria-stabilized zirconia; the first coating comprises at least one precious metal; and the second coating comprises scandia or a spinel.

18. The method of claim 1, wherein the deposition of the first and second coatings is compositionally graded.

19. The method of claim 1, wherein the protecting-composite has a composition and thickness sufficient to reduce or prevent damage to the thermal barrier coating which would otherwise be caused by the reaction with or infiltration of molten contaminant compositions into the thermal barrier coating at elevated temperatures.

20. The method of claim 19, wherein the thermal barrier coating has been deposited on a gas turbine engine component.

* * * * *